United States Patent [19]

Link et al.

[11] Patent Number: 4,644,636
[45] Date of Patent: Feb. 24, 1987

[54] DEVICE FOR CHANGING CHUCK ATTACHMENT JAWS

[75] Inventors: Helmut F. Link, Aichwald; Walter Grossmann, Baltmannsweiler, both of Fed. Rep. of Germany

[73] Assignee: Index-Werke Komm.-Ges. Hahn & Tessky, Fed. Rep. of Germany

[21] Appl. No.: 816,279

[22] Filed: Jan. 6, 1986

[30] Foreign Application Priority Data

Jan. 17, 1985 [DE] Fed. Rep. of Germany ....... 3501416

[51] Int. Cl.⁴ .............................................. B23Q 3/156
[52] U.S. Cl. ..................................................... 29/568
[58] Field of Search ................ 29/568, 20 A; 279/123

[56] References Cited

U.S. PATENT DOCUMENTS 4,313,252 2/1982 Kuska et al. ........................... 29/568
4,532,692 8/1985 Miyachi ................................. 29/568

FOREIGN PATENT DOCUMENTS 2610587 9/1977 Fed. Rep. of Germany ........ 29/568
2624775 12/1977 Fed. Rep. of Germany ........ 29/568
2805828 8/1979 Fed. Rep. of Germany ........ 29/568
555273 1/1980 Japan ..................................... 29/568

*Primary Examiner*—William R. Briggs
*Attorney, Agent, or Firm*—Shenier & O'Connor

[57] ABSTRACT

Device for changing the attachment jaws of a chuck provided with main jaws, each of which has two axially aligned bolts for exact positioning of the attachment jaws. These bolts engage and fit into bores in the attachment jaw and guide a locking slide means which is displaceable in a radial direction by means of a headless screw inserted into the attachment jaw. A gripping device for the atachment jaws has a screw driving means and a threaded bore for the screw and so the latter is screwed partially out of the attachment jaw and into the gripping device in order to connect gripping device and attachment jaw with one another.

16 Claims, 7 Drawing Figures

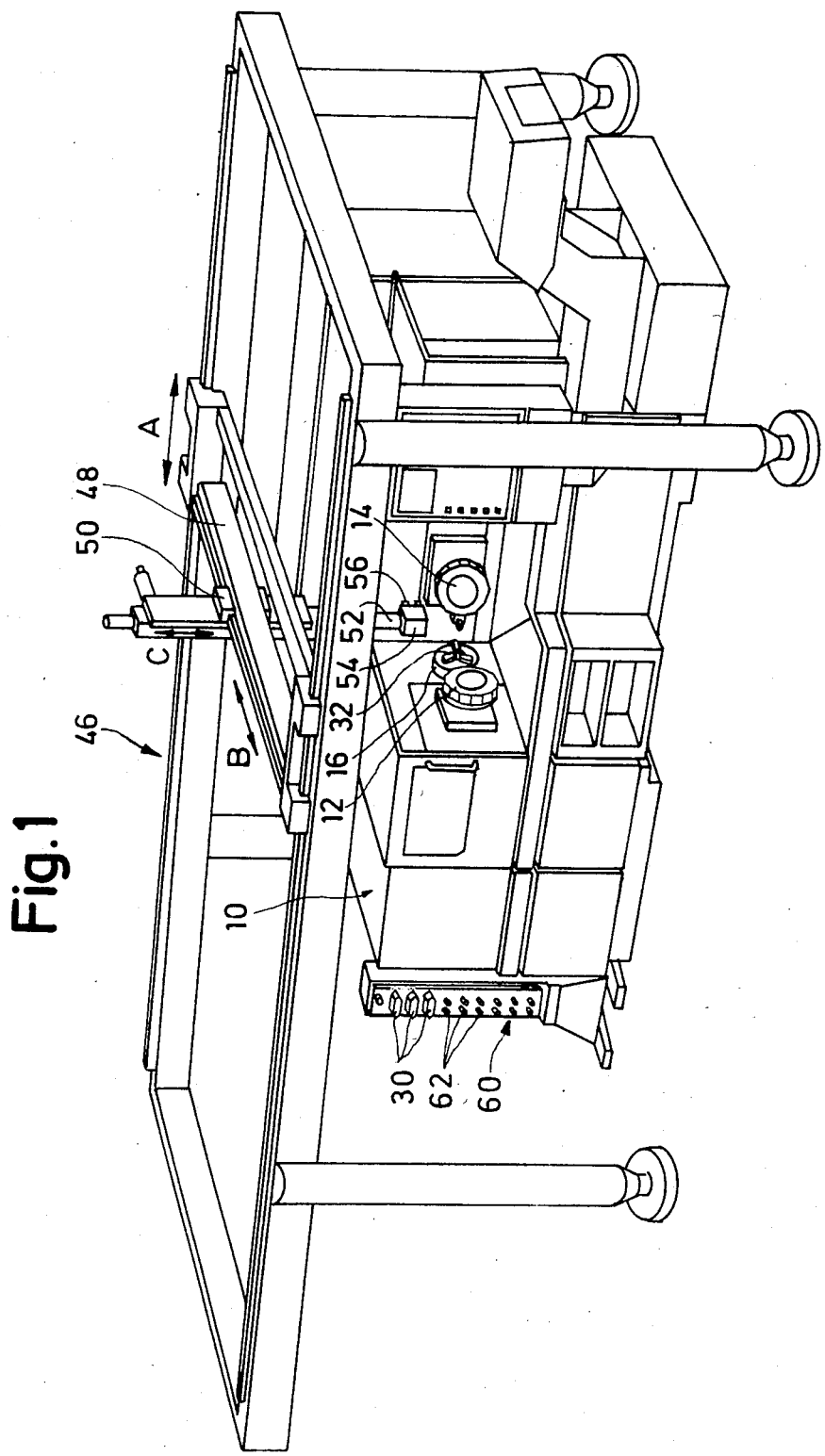

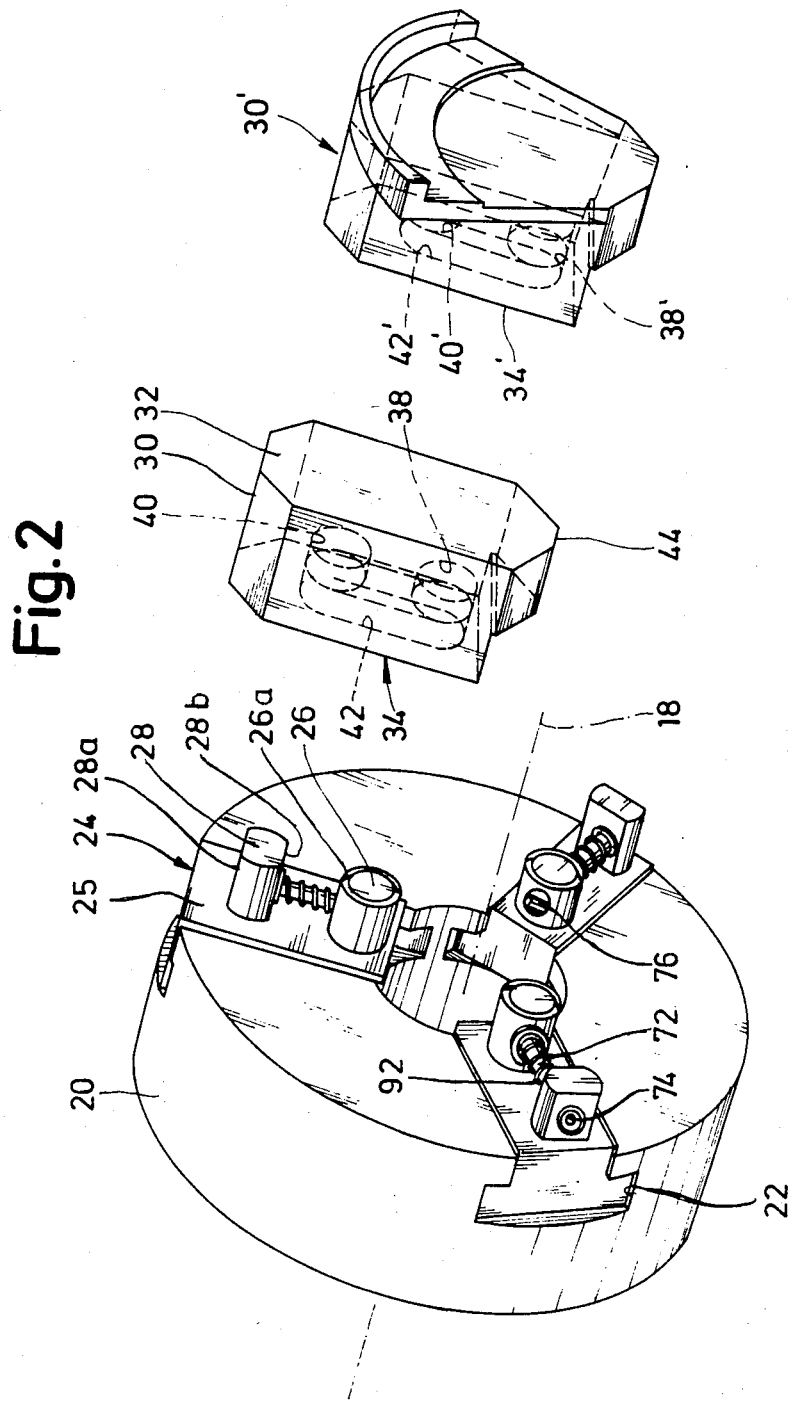

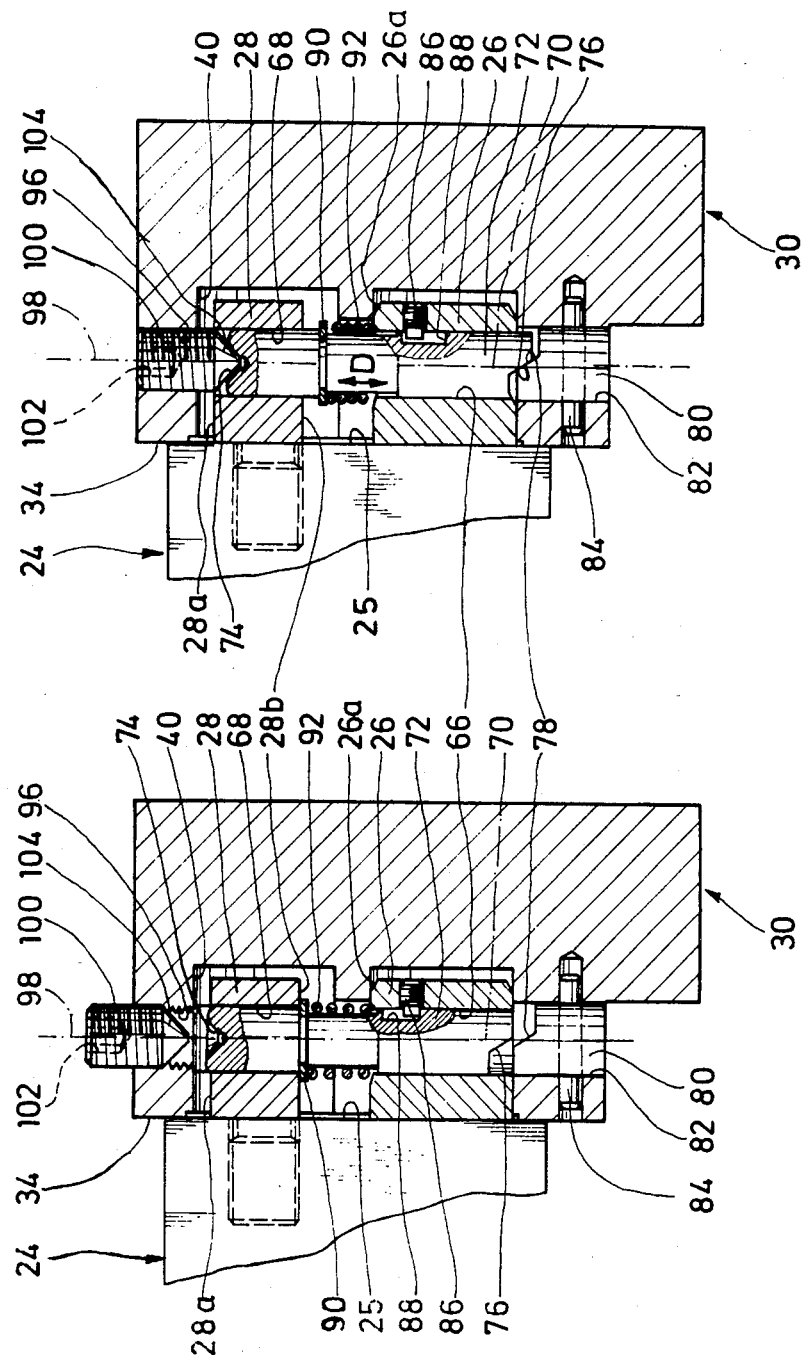

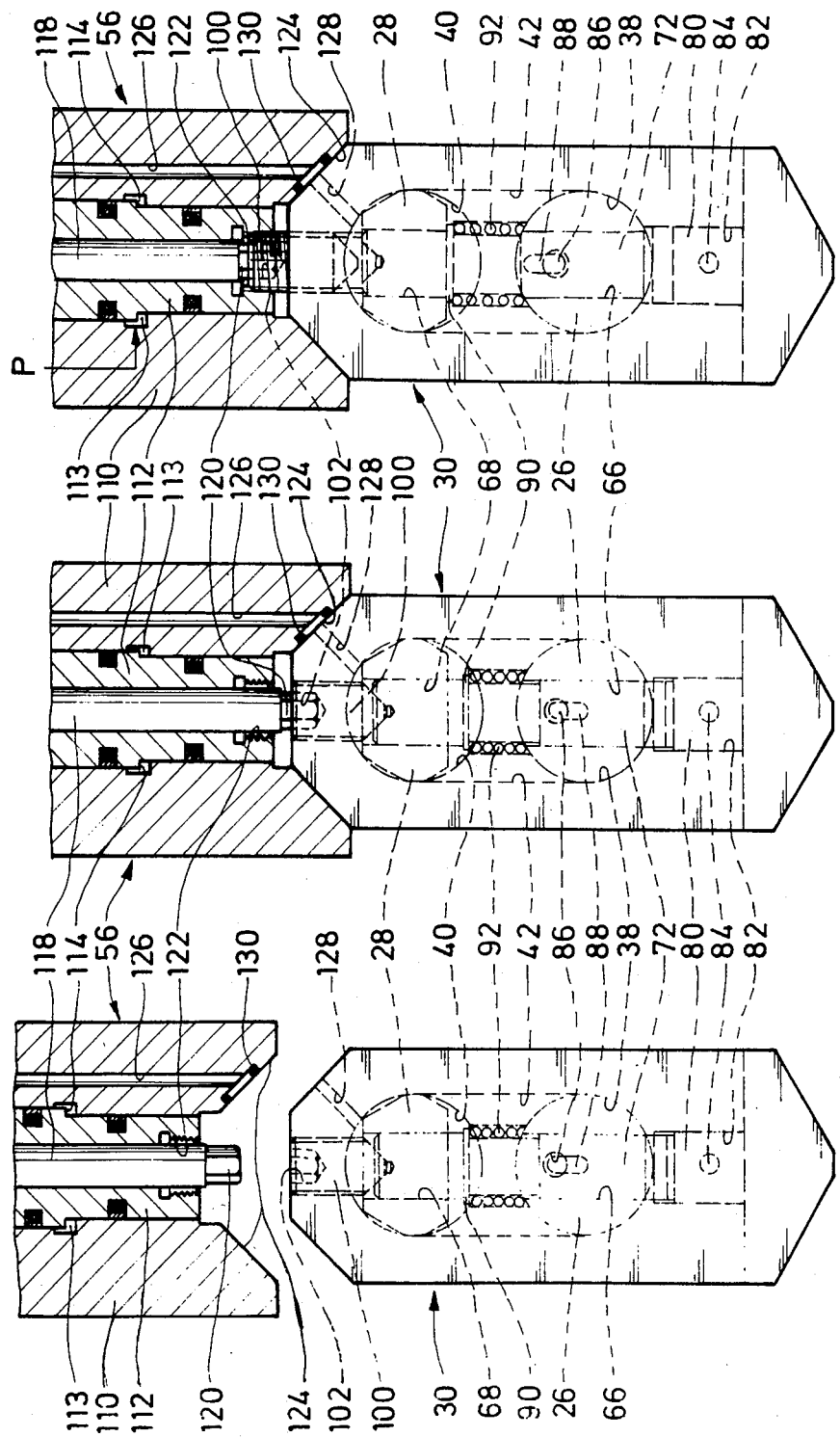

DEVICE FOR CHANGING CHUCK ATTACHMENT JAWS

The invention relates to a device for changing chuck attachment jaws for chucks comprising a plurality of main jaws displaceable on a chuck body in radial direction relative to the chuck axis, each of these main jaws mounting an interchangeable attachment jaw serving to clamp workpieces.

It is already quite customary in machine tools, in particular lathes, not only for the machining process itself to be operated automatically but also for tools and workpieces to be changed automatically. A flexible and completely automatic production process does, however, necessitate the possibility of automatically adapting the clamping jaws of a chuck to workpieces having varying diameters or differing surfaces. Chucks and changing devices of the type mentioned at the outset are therefore already known, in which all the attachment jaws of a chuck may be changed at the same time (cf. e.g. "Werkstatt und Betrieb", 117, 1984, No. 5, page 304 and No. 8, page 482 as well as German laid-open paper DE-OS No. 26 10 587, FIGS. 3 to 6). These known changing devices do, however, require receiving means for a set of attachment jaws which are complicated and also large in construction. This causes problems with regard to space in the operating area of the machine tool, the heavy receiving means necessitate complicated handling apparatus and the changing of large segment jaws is not even possible.

A device for changing chuck attachment jaws is also known, in which only one attachment jaw is changed each time and the chuck is then rotated further to the position of the next clamping jaw, i.e. through 120° in the case of a three-jaw chuck (cf. FIGS. 1 and 2 of DE-OS No. 26 10 587). However, this known changing device is also relatively complicated and constructed on a large scale so that it is correspondingly heavy. It has, for instance, a frame with two guide rails which are aligned with one another and leave a space between them the width of an attachment jaw. The attachment jaws to be attached are positioned on one rail and the attachment jaws which have been removed on the other rail. Each main jaw has, on its end face, a tangentially aligned guide member with a T-shaped cross section. An attachment jaw having a complementary profile on its rear end face may be slipped onto this guide member in a tangential direction. A safety bolt which is urged forwards in axial direction by a spring is guided for displacement in a bore in the main jaw which extends at right angles to the front end face of the jaw. This safety bolt engages in a blind-end bore in the attachment jaw once this jaw is attached to the main jaw and correctly positioned. To release the attachment jaw the safety bolt can be pressed back by means of a push rod actuated by the frame of the changing device in its changing position. The attachment jaw is then pushed onto the second guide rail by the attachment jaw ready to be exchanged. For this purpose, the frame of the changing device mounts a double acting cylinder for pressure medium, the piston rod of which is provided with driver members for displacing the attachment jaws located on the guide rails. Apart from its space requirements and heavy weight, this known construction has additional disadvantages. It is not suitable for exchanging large segment jaws and the guide means on both the main and attachment jaws are open to the side and therefore subject to a great deal of soiling during machining of a workpiece. Consequently, either difficulties occur when changing the jaws or the guide means for the attachment jaws are no longer free from play. This known construction cannot be used for chucks having more than three clamping jaws since, in the case of a four-jaw chuck, the clamping jaws adjacent the attachment jaw to be changed impede the changing device carrying the attachment jaws.

The object underlying the invention was to develop a device for changing individual attachment jaws which guarantees that the attachment jaws are seated securely and free from play and are not subject to the problems of dust and dirt occuring during the machining of workpieces. The invention is based on the aforementioned known device for changing individual attachment jaws, i.e. a changing device of the type described at the outset, in which main jaw and attachment jaw have a recess and a projection of their facing end surfaces, the projection being insertable into the recess in a direction having at least one component in the direction of the chuck axis, and which also comprises an attachment jaw gripping device for holding an attachment jaw to be changed, this gripping device having an actuating element for actuating a locking device between main jaw and attachment jaw. Proceeding on this basis the object of the invention is accomplished in that main jaw and attachment jaw have at least two recesses and two projections on their facing end surfaces, one of these projections being insertable into the associated recess to fit in a radial as well as a tangential direction and the other projection to fit at least in a tangential direction, and that the locking device has clamping faces inclined relative to the end faces for pressing these end faces together. In such a construction, the open guide means at the sides of the main and attachment jaws may be avoided and so the elements required for automatic changing of the attachment jaws cannot become soiled during the machining of workpieces. Due to the projection which determines the radial position of the attachment jaw and is designed in particular as a centering bolt, a very high degree of accuracy of the chuck may be achieved in a radial direction. It is then unnecessary to machine the clamping faces of the attachment jaws subsequent to their installation on the chuck of the machine tool. The two projections together result in a positive connection between the main jaw and the attachment jaw and this facilitates optimum transmission of the various torques occurring. When the inclined clamping faces are arranged accordingly and these faces are only slightly inclined, high pressing forces may be achieved between the attachment jaw and the main jaw and at the exact place where they are most effective, i.e. in the vicinity of the clamping point of a workpiece.

In a preferred embodiment of the inventive changing device, one of the projections has the shape of a bolt with a circular-cylindrical peripheral surface which is insertable in a snug fit into a recess designed as a bore whereas the other projection is insertable into its recess so as to be free from clearance only in a tangential direction. The fact that the circular-cylindrical surfaces in the form of pins or bores can be produced with a high degree of precision enables a very exact positioning of the attachment jaws in radial direction and this may be achieved in a particularly simple manner.

The inclined clamping faces of the locking device may be formed, for example, by the flanks of a helicoidal locking element and a corresponding nut thread or by a disc having an end face forming part of a helix and a corresponding countersurface. It is, however, far more recommendable to provide the locking device with a slide means bearing one of these first inclined clamping faces, which cooperates with a butting surface, and to have the slide means displaceable by a screw. In a construction of this type, it is possible to have second inclined clamping faces arranged in spaced relation to the first inclined clamping faces by using simple means, i.e. by designing the construction such that the slide means is held on the one jaw and the screw in a threaded bore in the other jaw, that screw and slide means have on their facing ends a male cone and a female cone, respectively, these male and female cones engaging one another and forming second inclined clamping faces, the axes of the male and female cones being offset relative to one another such that by tightening the screw the facing end surfaces of the jaws are adapted to be pressed against one another and, finally, that the first inclined clamping face of the slide means is arranged in spaced relation to the end of the slide means facing the screw.

As shown by the above, it is, in principle, unimportant whether the slide means is arranged on the main jaw or on the attachment jaw and the other inclined clamping face cooperating with it is then arranged on the other jaw. If the clamping effect of the second inclined clamping faces is dispensed with, the slide means and the screw actuating this slide means may be mounted on one and the same jaw. It is, however, particularly favourable to have an embodiment, in which the slide means is guided for displacement on the main jaw and the screw is held in a threaded bore in the attachment jaw. In this case, only one single movable part need be provided on the attachment jaws to be interchanged, i.e. the screw.

In the case of embodiments having a screw as part of the locking device, it is recommended that the attachment jaw gripping device be provided with a screw driving means for this screw, irrespective of whether the screw is mounted on the main jaw or the attachment jaw. In this case, only the attachment jaw gripping device need then approach the chuck when a jaw is to be changed. Particular advantages result in this connection when the screw is arranged on the attachment jaw and the attachment jaw gripping device has a threaded bore for the screw so that gripping device and attachment jaw are connectable with one another by this screw when, for instance, the screw is turned such that it partially protrudes out of the attachment jaw and into the gripping device. Particularly suitable for this embodiment is a headless screw which is advantageously provided with a polygonal recess in its outwardly facing side.

In order to prevent the screw connection between gripping device and attachment jaw loosening during handling of an attachment jaw, the threaded bore of the attachment jaw gripping device is provided, in a preferred embodiment of the invention, in a second slide means of the gripping device. This means that the attachment jaw may be secured against a stop of the gripping device by the slide means. This second slide means may be activated in a particularly simple manner when it is a piston actuated by pressure medium.

It is possible to have one of the two projections arranged on the main jaw and the other on the attachment jaw. However, in order to keep the design of the attachment jaw as simple as possible it is recommended that both projections be arranged on the end face of the main jaw.

To avoid the use of special guide means for the slide means of the locking device and to have the slide means actuated in one direction only, a particularly favourable embodiment is one, in which the slide means is guided for displacement in guide openings in the two projections mounted on one of the two jaws, preferably the main jaw, and is provided with a return spring for disengaging the first inclined clamping faces from one another as well as a stop defining an inoperative position of the slide means in which the attachment jaw is removable from the main jaw.

As already mentioned, the fundamental concept of the invention avoids the use of laterally open guide means subject to the risk of soiling, e.g. the guide means of the changing device disclosed in DE-OS No. 26 10 587. In a preferred embodiment of the invention, the end faces of the main jaw and the attachment jaw form sealing faces enclosing at least one of the recesses and the gripping device and the attachment jaw have ducts for compressed air, these ducts communicating with one another when the gripping device is attached to the attachment jaw, the duct of the attachment jaw communicating with the recess. In this way, the end faces of the main and attachment jaws may be blasted with compressed air, i.e. cleaned of dirt and dust particles, while an attachment jaw is being changed. If a sensor is provided in the compressed air supply means of the gripping device for measuring back pressure, a check can then be made, once the attachment jaw is secured to the main jaw, to see whether the attachment jaw abuts exactly on the main jaw or whether this is hindered by shavings, turnings or other dirt particles. The sealing faces formed by the end faces of the two jaws may bring about a sealing effect only when the attachment jaw fits properly against the main jaw.

Finally, a preferred embodiment of the inventive changing device is characterized by a storage means for the attachment jaws, this storage means being adapted to be reached by the gripping device and having retaining means for the attachment jaws corresponding to the retaining means of the main jaws. This means that an attachment jaw may be secured to or removed from the attachment jaw storage means by the same means as those with which an attachment jaw may be mounted on or dismounted from a main jaw.

Additional features, advantages and details of the invention are specified in the attached claims and/or the following description or are shown in the attached drawings of a particularly favourable embodiment of the inventive changing device. In the drawings, FIG. 1 is a schematic illustration of a lathe equipped with the inventive char'ging device;

FIG. 2 is a schematic illustration of ±he chuck of this lathe and shows the main jaws mounted in the chuck body and two different attachment jaws in a detached position;

FIG. 3 shows a section along a radial plane through part of a main jaw and an attactment jaw mounted on the main jaw and illustrates the locking device in a released state;

FIG. 4 is an illustration corresponding to FIG. 3 but showing the locking device in a locked state;

FIG. 5 is a front view of a clamping jaw consisting of main jaw and attachment jaw and a section through the front part of the attachment jaw gripping device approaching the clamping jaw;

FIG. 6 is an illustration corresponding to FIG. 5 after the attachment jaw gripping device has been attached to the attachment jaw, and FIG. 7 is an illustration corresponding to FIG. 6 but showing the screw of the locking device partially protruding into the attachment jaw gripping device.

FIG. 1 shows a lathe designated as a whole as 10. This lathe has two tool turrets 12 and 14 for machining workpieces and a chuck 16 for holding the workpieces. The chuck is secured to a work spindle which is driven about a horizontal axis but is not illustrated in FIG. 1. The axis about which the chuck 16 rotates has been designated in FIG. 2 as 18.

As shown in FIGS. 1 and 2, the chuck 16 has a chuck body 20 with radially aligned slots 22 which have a T-shaped cross section. A main jaw 24 is guided for radial displacement in each of these slots. All the main jaws 24 are displaced synchroncusly in a radial inward or radial outward direction by means belonging to the known chucks and therefore to the state of the art. These means are not the subject matter of the invention and have not therefore been illustrated. Each main jaw 24 mounts a centering belt 26 defining, within the meaning of the above remarks, a first projection and a wedge bolt 28 defining a second projection. The centering bolt 26 is designed according to the invention as a circular cylinder, the axis of which runs parallel to the chuck axis 18 and the front edge of which is replaced by a peripheral bevel 26a. The wedge bolt 28 has the shape of a circular cylinder with flattened surfaces 28a, 28b extending tangentially to the chuck axis 18. The axis of the wedge bolt 28 also runs parallel to the chuck axis 18.

FIG. 2 illustrates, in the center, a first attachment jaw 30 which forms a clamping jaw 32 (FIG. 1) together with a main jaw 24. The attachment jaw 30 has front and rear end faces 32 and 34, respectively. According to the invention, the latter extends at right angles to the chuck axis 18 and is plane. A front end face of each main jaw 24 is also plane and extends at right angles to the chuck axis 18. The end faces 25 and 34 could also be inclined in the same manner relative to the chuck axis 18. First and second recesses 38 and 40, respectively, are inserted into the attachment jaw 30 from its rear end face 34. These recesses are both circular cylindrical in shape and their axes run parallel to the axes of the bolts 26 and 28. These axes therefore run preferably parallel to the chuck axis 18 although all the axes could be inclined in the same manner relative to the chuck axis 18. Furthermore, a third recess 42 is also worked into the attachment jaw 30 from its rear end face 34. This recess has the shape of an elongated groove and its ends merge smoothly with the sides of the recesses 38 and 40. In accordance with the invention, the diameter of the first recess 38 is the same as or very slightly greater than the diameter of the centering bolt 26. The same applies for the diameter of the second recess 40 and the greatest diameter of the wedge bolt 28. This means that both bolts 26 and 28 form a snug fit in the recesses 38 and 40. A workpiece clamping face of the attachment jaw 30 has been designated 44.

FIG. 2 also illustrates a second embodiment of an attachment jaw 30' which is a so-called segment jaw. Corresponding areas of the attachment jaws 30 and 30' have been given the same reference numerals but with an apostrophe added to designate the areas of the attachment jaw 30'. FIG. 2 therefore shows that various types of attachment jaw may be mounted on one and the same main jaw 24. These need only have recesses 38, 40, 42 or 38', 40', 42' which are designed and arranged in the same way.

The locking device with which an attachment jaw 30 or 30' may be secured in position on a main jaw 24 will be described further on and in particular on the basis of FIGS. 3 and 4.

A longitudinal slide 48 is guided on a frame 46 covering the lathe 10 (see FIG. 1) for displacement in the directions of the doubleheaded arrow A. The slide may be driven along the frame by drive means which are not illustrated. This longitudinal slide serves to guide a cross slide 50 which may be moved back and forth on the longitudinal slide in the directions of the double-headed arrow B and by drive elements which are not illustrated. A supporting arm 52 is guided on the cross slide 50 for displacement in the vertical direction and may be moved up and down in the directions of the double-headed arrow C by drive elements which are, again, not illustrated. A rotary head 54 is mounted on the lower end of this supporting arm 52 and may be rotated, in relation to the supporting arm 52, about a vertical axis and again by drive elements which are not illustrated. Two attachment jaw gripping devices 56 are mounted on this rotary head, one above the other in vertical spaced relation. One of these gripping devices 56 will be explained in greater detail on the basis of FIGS. 5 to 7. The cross-shaped gantry or portal formed by the frame 46 does, of course, serve as well for handling workpieces and tools by means of gripping devices attached to the rotary head 54. These devices are not, however, illustrated.

Finally, an attachment jaw magazine 60 stands next to the lathe 10. Bolts 62 are mounted on this magazine in superposed pairs. Each pair consists of two bolts corresponding to the centering bolt 26 and the wedge bolt 28 of a main jaw 24 of the chuck and has the same elements of the locking device as each of the main jaws 24. For this reason it is unnecessary to explain and illustrate the design of these pairs of bolts 62 in greater detail. Three attachment jaws 30 are illustrated at the top of the magazine 60.

The FIGS. 3 and 4 show that the centering bolt 26 and the wedge bolt 28 each have a guide bore 66 and 68, respectively, the axes 70 of which are in alignment with one another and in whict a locking slide means 72 is guided for displacement in the directions of the double-headed arrow D. This slide means has a female cone 74 in one end face and an inclined clamping face 76 at the other end. This clamping face may cooperate with an inclined face 78 of a clamping member 80 which is inserted into an opening 82 in the attachment jaw 30 and held in this opening by a locking pin 84. To prevent the locking slide means 72 rotating relative to the attachment jaw 30, a trunnion screw 86 is screwed into the centering bolt 26 and engages in a longitudinal slot 88 in the locking slide means 72. The length of this slot corresponds to the length of the path of displacement of the locking slide means. The left-hand end position of the locking slide means 72 illustrated in FIG. 3, which is its inoperative position, is defined by a snap ring 90 inserted into a groove in the locking slide means. This ring abuts on the wedge bolt 28 due to the action of a return spring 92 supported on the centering bolt 26. In this inoperative position of the locking slide means 72, the lower end of this slide means (according to FIG. 3) does not, in accordance with the invention, project out of the centering bolt 26 and the upper end of the locking slide means (according to FIG. 3) may reach, at the most, as far as the wall of the second recess 40.

On its radially outer side the attachment jaw 30 has a threaded bore 96, the axis 98 of which is, according to the invention, spaced at a slightly greater distance from the rear end face 34 of the attachment jaw 30 than the axis 70 of the locking slide means 72. A headless tightening screw 100 is screwed into this threaded bore 96 and is provided at one end with a hexagonal recess 102 and at the other end with a male cone 104.

As shown in FIG. 4, an attachment jaw 30 is locked to a main jaw 24 and its rear end face 34 clamped against the front end face 25 of the main jaw 25 when the tightening screw 100 is screwed down. The clamping face 76 then rests against the clamping face 78 and at the same time the female cone 74 presses the radially outward portion of the attachment jaw 30 against the front end face 25 of the main jaw 24 via the male cone 104 of the tightening screw 100. If, on the other hand, the tightening screw 100 is unscrewed out of the female cone 74 of the locking slide means 72, the return spring 92 causes the slide means to be released and so the attachment jaw 30 may be withdrawn from the main jaw 24 in the direction of the chuck axis 18.

One of the attachment jaw gripping devices 56 will now be explained in greater detail on the basis of FIGS. 5 to 7.

The gripping device has a gripper body 110 in which a piston 112 is guided for longitudinal displacement. This piston is surrounded by a chamber 113 for pressure medium, in the region of which the piston has a shoulder 114. The piston 112 is pressed upwards in accordance with FIGS. 5 to 7 when the chamber 112 is impinged by a pressure medium such as hydraulic oil, compressed air or the like via a bore which is not illustrated. A screw driving means 118 is arranged in the piston 112 for rotation and longitudinal displacement. It may be caused to rotate by drive means which are not illustrated and has at its front end a hexagonal head 120 which fits into the hexagonal recess 102 in the tightening screw 100. This screw driving means can be pressed into its lower end position illustrated in FIGS. 5 and 6 by a spring which is not illustrated and a stop. At its front or lower end (according to the drawings) the piston 112 has a threaded bore 122 for the tightening screw 100, this bore surrounding the screw driving means 118. Finally, the gripper body 110 has stop faces 124 for an attachment jaw 30 as well as a duct 126 for compressed air which communicates with a duct 128 for compressed air in the attachment jaw 30 when the gripping device 56 is attached to an attachment jaw 30 (see FIGS. 6 and 7). A sealing ring 130 is inserted into the gripper body 110 to seal the colnmunicating ducts. The duct 128 leads either to the recess 40 or the recess 42 of the attachment jaw 30.

As shown in FIGS. 3 and 5 to 7, the rear end face 34 of the attachment jaw 30 and the front end face 25 of the main jaw 24 form sealing surfaces surrounding the recesses 38, 40, 42. Any measurement of back pressure in the duct 126 will therefore indicate whether or not the attachment jaw 30 is seated exactly on the main jaw 24, at least when, in accordance with the invention, the main jaw 24 is leakproof at its front end face 25 and does not, for example, leak at the places where the bolts 26 and 28 are mounted.

The manner in which an attachment jaw 30 is changed will now be described on the basis of FIGS. 5 to 7.

First of all, the attachment jaw gripping device 56 is brought up to the attachment jaw 30 as shown in FIG. 6. The screw driving means 118, which is urged downwardly in the longitudinal direction by the spring, slowly turnsso that it can penetrate the hexagonal recess 102. When the screw driving means 118 continues to rotate, the tightening screw 100 is turned such that approximately half the screw protrudes out of the attachment jaw 30 and into the threaded bore 122 of the piston 112 of the attachment jaw gripping device so that the attachment jaw and the gripping device 56 are connected with one another. A secure connection is then ensured in that pressure medium impinges on the pressure medium chamber 112 and so the attachment jaw 30 is braced against the stop faces 124 of the gripping device. Whilst the tightening screw 100 is being partially unscrewed out of the attachment jaw 30 the return spring 92 pushes the locking slide means 72 into its inoperative position and so the attachment jaw 30 may then be removed from the main jaw 24 or from the attachment jaw magazine 60.

An attachment jaw 30 is secured to a main jaw 24 or a pair of bolts 62 on the magazine 60 in the reverse manner. Gripping device 56 and attachment jaw 30 approach the point of connection in their attached state as shown in FIG. 7. The attachment jaw 30 is slipped onto the bolts 26, 28 in axial direction and the tightening screw 100 then screwed into the attachment jaw 30 by the screw driving means 118 until the clamping jaws 76, 78 terminate the path of displacement of the locking slide means 72. For this reason, the drive means for the screw driving means 118 is provided, according to the invention, with a torque limiter which is not illustrated. Also the drive means for the screw driving means 118 is stitched off by a control means, which is also not illustrated, when the tightening screw 100 has pressed the screw driving means 118 into the piston 112 to the extent shown in FIG. 7. According to the invention, compressed air impinges on the duct 126 during attachment and possibly during tightening of an attachment jaw 30 against a main jaw 24 so that the end faces 25 and 34 are cleaned.

Once an attachment jaw of the chuck 16 has been changed, the chuck will be rotated through 120°, this being controlled by the control means of the lathe 10.

As illustrated most clearly in FIG. 2, the attachment jaws of the inventive construction do not have any bores or the like in those areas in which a workpiece is clamped. In addition, it is understood that the invention may also be used for constructions with which a workpiece is not clamped by the clamping jaws at an outer circumference but, according to the invention, at an inner circumference.

What is claimed is:

1. An apparatus for changing chuck attachment jaws for chucks comprising a plurality of main jaws displaceable on a chuck body in radial direction relative to the chuck axis, each of said main jaws mounting an interchangeable attachment jaw serving to clamp workpieces, main jaw and attachment jaw having a recess and a projection on their facing end surfaces, said projection being insertable into said recess in a direction having at least one component in the direction cf the chuck axis, and also comprising an attachment jaw gripping device for holding an attachment jaw to be changed, said gripping device havlng an actuating element for actuating a locking device provided between main jaw and attachment jaw, characterized in that main jaw and attachment jaw (24 and 30, respectively) have at least two recesses (38, 40) and two projections (26, 28) on their facing end surfaces (25, 34), one of said projections (26) being insertable into the associated recess (38 or 40) to fit in a radial as well as a tangential direction and the other projection (28) to fit at least in a tangential direction, and that said locking device (100, 72, 80) has clamping faces (76, 78; 74, 104) inclined relative to said end faces (25, 34) for pressing said end faces together.

2. Device as defined in claim 1, characterized in that one of said projections (26) has the shape of a bolt with a circularcylindrical peripheral surface insertable in a snug fit into a recess (38) designed as a bore, and that the other projection (28) is insertable into its recess (40) so as to be free from clearance only in a tangential direction.

3. Device as defined in claim 1, characterized in that first inclined clamping faces (76, 78) are arranged in the vicinity of the workpiece clamping face (44) of the attachment jaw (30).

4. Device as defined in claim 1, characterized in that said first inclined clamping faces (76, 78) form an angle of at the most 45° with a plane extending at right angles to the chuck axis (18).

5. Device as defined in claim 1, characterized in that the locking device has a slide means (72) bearing one of said first inclined clamping faces (76) and displaceable by means of a screw (100).

6. Device as defined in claim 5, characterized in that said slide means (72) is held on the one jaw (24) and said screw (100) in a threaded bore (96) in the other jaw (30), that screw and slide means have on their facing ends a male cone (104) and a female cone (74), respectively, said male and female cones engaging one another and forming second inclined clamping faces, the axes (98, 70) of said male and female cones being offset relative to one another such that by tightening said screw (100) said facing end faces (25, 34) of said jaws (24, 30) are adapted to be pressed against one another, and that said first inclined clamping face (76) of said slide means (72) is arranged in spaced relation to the end of said slide means facing said screw (100).

7. Device as defined in claim 5, characterized in that said slide means (72) is guided for displacement on said main jaw (24) and said screw (100) is held in a threaded bore (96) in said attachment jaw (30).

8. Device as defined in claim 5, characterized in that said attachment jaw gripping device (56) has a screw driving means (118) for said screw (100).

9. Device as defined in claim 7 characterized in that said attachment jaw gripping device (56) has a screw driving means (118) for said screw (100) and in that said attachment jaw gripping device (56) has a threaded bore (122) for said screw (100) so that gripping device (56) and attachment jaw (30) are connectable with one another by said screw.

10. Device as defined in claim 9, characterized in that said threaded bore (122) of said attachment jaw gripping device (56) is provided in a second slide means (112) and said attachment jaw (30) is adapted to be tightened against a stop (124) of said gripping device by said second slide means.

11. Device as defined in claim 10, characterized in that said second slide means (112) is a piston actuated by pressure medium.

12. Device as defined in claim 1, characterized in that the locking device has a slide means (72) bearing one of said first inclined clamping faces (76) and displaceable by means a screw (100), in that said slide means is guided for displacement on said main jaw (24) and said screw (100) is held in a threaded bore (96) in said attachment jaw (30), in that said attachment jaw gripping device (56) has a screw driving means (118) for said screw (100), in that said attachment jaw gripping device (56) has a threaded bore (122) for said screw (100) so that gripping device (56) and attachment jaw (30) are connected with one another by said screw, in that said threaded bore (122) of said attachment jaw gripping device (56) is provided in a second slide means (112) and said attachment jaw (30) is adapted to be tightened against a stop (124) of said gripping device by said second slide means, and in that said screw driving means (118) is arranged in a longitudinal bore in said second slide means (112).

13. Device as defined in claim 1, characterized in that the two projections (26, 28) are arranged on the end face (25) of said main jaw (24).

14. Device as defined in claim 5, characterized in that said slide means (72) is guided for displacement on said main jaw (24) and said screw (100) is held in a threaded bore (96) of said attachment jaw (30), in that the two projections (26,28) are arranged in the end face (25) of said main jaw (24) and in that said slide means (72) is guided for displacement in said guide openings (66, 68) in said two projections (26,28) and provided with a return spring (92) for disengaging said first inclined clamping faces (76, 78) from one another as well as a stop (90) defining an inoperative position of said slide means in which said attachment jaw (30) is removable from said main jaw (24).

15. Device as defined in claim 1, characterized in that the end faces (25, 34) of said main jaw (24) and said attachment jaw (30) form sealing faces enclosing at least one of said recesses (38, 40) and that said gripping device (56) and said attachment jaw (30) have ducts (126, 128) for compressed air, said ducts communicating with one another when said gripping device (56) is attached to said attachment jaw (30), the duct (128) of said attachment jaw (30) communicating with said recess (40).

16. Device as defined in claim 1, characterized by a storage means (60) for the attachment jaws, said storage means adapted to be reached by said gripping device (56) and having retaining means (62) for the attachment jaws (30) corresponding to the retaining means (26, 28, 72) of the main jaws (24).

* * * * *